Patented Apr. 25, 1950

2,505,053

UNITED STATES PATENT OFFICE 2,505,053

METHOD FOR RECOVERING GRISEIN

Frederick A. Kuehl, Jr., Westfield, and Louis Chaiet, Newark, N. J., assignors to Merck & Co., Inc., Rahway, N. J., a corporation of New Jersey No Drawing. Application April 3, 1948, Serial No. 18,848

12 Claims. (Cl. 167—65)

This invention relates to therapeutically valuable substances, and particularly to substances obtained by the cultivation of a strain of the micro-organism *Streptomyces griseus* in suitable culture medium.

According to a process disclosed in the publication of Reynolds, Schatz and Waksman, Proceedings of the Society of Experimental Biology and Medicine, 64, pages 50 to 54 (1947), active substances can be adsorbed from a culture broth of this type by activated charcoal and then eluted from the charcoal with a 9 per cent ethyl alcohol solution. It has been found that elution with ethyl alcohol results in the recovery of only about half of the total activity.

It has now been discovered, according to the present invention, that the active substances, after being adsorbed from culture broth by activated charcoal can be eluted from the charcoal with an aqueous solution of pyridine or α-picoline. The eluate thus obtained contains approximately 75 per cent of the adsorbed active material.

In accordance with a preferred embodiment of our invention the micro-organism *Streptomyces griseus* is cultivated in a medium containing meat extract, a peptone (an enzymatic digest of casein), sodium chloride and water. The culture broth can be treated with diatomaceous filter aid and to remove mycelium and other extraneous matter and the active substance adsorbed from the reaction mixture by the addition of activated charcoal. We have obtained best results, however by first acidifying the culture broth, treating the acidified medium with a diatomaceous filter aid and then adjusting the pH of the filtrate to between 7.5 and 8 prior to the addition of activated charcoal. The active substance is then adsorbed from the reaction mixture with activated charcoal. The activated charcoal containing the active substance is removed by filtration and eluted with an aqueous solution of pyridine or α-picoline. A solid grisein concentrate is obtained by concentrating the eluate to dryness at reduced pressure.

Alternatively, the solid concentrate can be recovered and further purified by concentrating the eluate to a small volume and adding about ten volumes of alcohol. The precipitate which forms is then removed and the filtrate is added to dry ether causing precipitation of the grisein which is recovered and dried.

The solid grisein concentrate is a brown amorphous substance which is soluble in water and has an activity of at least 200 units per mg. as determined according to the *Escherichia coli* dilution method described in the Reynolds et al. publication previously mentioned. This product is useful as a therapeutic agent and can also be used as an intermediate for preparing other substances of therapeutic value.

Regarded in certain of its broader aspects, the novel process in accordance with the present invention comprises adsorbing from culture broth the grisein obtained by cultivating a strain of the micro-organism *Streptomyces griseus* in a nutrient medium, eluting the adsorbate with an aqueous solution of pyridine or an aqueous solution of a lower alkyl substituted pyridine such as α-picoline and recovering the active substance from the eluate.

The following examples illustrate methods of carrying out the present invention but it is to be understood that these examples are given primarily by way of illustration and not of limitation.

Example 1

A solution of about 650 gallons of culture broth possessing a microbiological potency of about 200 units/ml. is formed by the cultivation of a strain of the micro-organism *Streptomyces griseus* on a suitable nutrient medium. This culture broth is acidified to a pH of about 2.5 to 3.0 with phosphoric acid. About 50 lb. of diatomaceous filter aid is added to the mixture and the mixture stirred and filtered. The filter cake is washed with about 100 gallons of water. The filtrate and the wash are combined, neutralized to about pH 7.5 to 8.0 with 30% sodium hydroxide and filtered. To the filtrate is added approximately 25 lb. of activated carbon. The mixture is stirred for about ½ hour and then filtered. The filter cake is washed by slurrying with about 100 gallons of water, followed by filtration. The filter cake comprising charcoal and adsorbed active material is added to a mixture of approximately 120 gallons of water and 40 gallons of pyridine or α-picoline. The mixture is stirred for about ½ hour. The spent carbon is filtered off and washed by recycling through the filter-press about 40 gallons of 25% pyridine or α-picoline for 15 minutes. The combined eluate and washings are evaporated at a pressure below atmospheric and a temperature below 40° C. to about 6 to 7 gallons and diluted with approximately 65 gallons (10 volumes) of methyl alcohol. The aqueous methyl alcohol solution is clarified by filtration and the active substance, together with inert material, is precipitated by addition in about 10 gallon portions to successive 30 gallon batches of dry ether. The insoluble material is removed by filtration and dried in a vacuum drier. The yield from the entire batch is about 1937 gm. of brown solid having a microbiological potency of about 320 grisein units/mg.

*Example 2*

Approximately 15 liters of a culture broth containing 1.1 million grisein units total activity is formed by the cultivation of a strain of the microorganism *Streptomyces griseus* in a medium containing meat extract, a peptone (an enzymatic digest of casein), sodium chloride and water. This broth is acidified to pH 3 with 85% phosphoric acid. The mixture is filtered and the filtrate adjusted to pH 8 with 30% sodium hydroxide solution. To this solution is added 50 gm. of activated carbon. The mixture is stirred, filtered and the filter cake washed with 1 liter of water. The filter cake, comprising carbon and adsorbed active material, is suspended in about 1260 cc. of an α-picoline solution (25 ml. α-picoline diluted to 100 ml. with water). The mixture is stirred and then filtered. The filtrate having a total potency of 610,000 units (55% of broth activity) is evaporated at a pressure below atmospheric and a temperature below 40° C. 3 ml. of the concentrate thus obtained is diluted with 10 volumes of methyl alcohol and the precipitate which forms is removed by centrifugation. The filtrate is added to 60 ml. of anhydrous ether, the resulting precipitate is removed by filtration and dried at a pressure below atmospheric. The product recovered weighed 0.03 gm. and had an antibiotic activity of approximately 194 units/ml.

*Example 3*

About 1290 ml. of culture broth having an activity of 479 grisein units/ml. is formed by the cultivation of a strain of the micro-organism *Streptomyces griseus* in a nutrient medium. This culture is filtered through diatomaceous filter aid to remove the mycelium. The resulting filtrate is stirred for ½ hour with 13 gm. of activated carbon which is then removed by filtration and washed with 130 ml. of water.

One-half of the adsorbate thus obtained is stirred with 65 ml. of 5% aqueous pyridine for 15 minutes and then separated by filtration. The carbon adsorbate is further eluted similarly with first a 10% and finally a 50% aqueous pyridine solution respectively. The individual filtrates were concentrated at reduced pressure to a residue the weights and activities of which are indicated below. The total amount of grisein recovered was about 74%.

| Eluate | Weight of Residue | Activity |
|---|---|---|
| | $Mg.$ | $u./mg.$ |
| 5% Pyridine | 455 | 300 |
| 10% Pyridine | 260 | 400 |
| 50% Pyridine | 176 | 129 |

Modifications may be made in carrying out the present invention without departing from the spirit and scope thereof and the invention is to be limited only by the appended claims.

We claim:

1. The process that comprises adsorbing grisein on activated charcoal from a culture broth obtained by cultivating a strain of the microorganism *Streptomyces griseus* in a nutrient medium, eluting the adsorbate with a solution selected from the group consisting of aqueous pyridine and aqueous α-picoline and recovering crude grisein from the eluate.

2. The process that comprises adsorbing grisein on activated charcoal from a culture broth obtained by cultivating a strain of the microorganism *Streptomyces griseus* in a nutrient medium, eluting the adsorbate with an aqueous solution of pyridine and recovering crude grisein from the eluate.

3. The process that comprises adsorbing grisein on activated charcoal from a culture broth obtained by cultivating a strain of the microorganism *Streptomyces griseus* in a nutrient medium, eluting the adsorbate with an aqueous solution of α-picoline and recovering crude grisein from the eluate.

4. The process that comprises treating a culture broth, obtained by cultivating a grisein producing strain of the microorganism *Streptomyces griseus*, with activated charcoal, eluting the charcoal with a solution selected from the class consisting of aqueous pyridine and aqueous α-picoline and recovering from the eluate a crude concentrate containing grisein.

5. The process that comprises treating a culture broth, obtained by cultivating a grisein producing strain of the microorganism *Streptomyces griseus*, with activated charcoal, eluting the charcoal with an aqueous solution of pyridine and recovering from the eluate a crude concentrate containing grisein.

6. The process that comprises treating a culture broth, obtained by cultivating a grisein producing strain of the microorganism *Streptomyces griseus*, with activated charcoal, eluting the charcoal with an aqueous solution of α-picoline and recovering from the eluate a crude concentrate containing grisein.

7. The process that comprises treating a culture broth, obtained by cultivating a grisein producing strain of the microorganism *Streptomyces griseus*, with activated charcoal, eluting the charcoal with a solution selected from the class consisting of aqueous pyridine and aqueous α-picoline, and concentrating the eluate to dryness thereby obtaining a concentrate containing grisein.

8. The process that comprises treating a culture broth, obtained by cultivating a grisein producing strain of the microorganism *Streptomyces griseus*, with activated charcoal, eluting the charcoal with an aqueous solution of pyridine, and concentrating the eluate to dryness thereby obtaining a concentrate containing grisein.

9. The process that comprises treating a culture broth, obtained by cultivating a grisein producing strain of the microorganism *Streptomyces griseus*, with activated charcoal, eluting the charcoal with an aqueous solution of α-picoline, and concentrating the eluate to dryness thereby obtaining a concentrate containing grisein.

10. The process that comprises treating a culture broth, obtained by cultivating a grisein producing strain of the microorganism *Streptomyces griseus*, with activated charcoal, eluting the charcoal with a solution selected from the class consisting of aqueous pyridine and aqueous α-picoline, concentrating the eluate to a small volume, diluting the concentrate with a lower aliphatic alcohol, filtering the mixture, adding ether and recovering the grisein containing precipitate thus formed.

11. The process that comprises treating a culture broth, obtained by cultivating a grisein producing strain of the microorganism *Streptomyces*

*griseus*, with activated charcoal, eluting the charcoal with an aqueous solution of pyridine, concentrating the eluate to a small volume, diluting the concentrate with a lower aliphatic alcohol, filtering the mixture, adding ether and recovering the grisein containing precipitate thus formed.

12. The process that comprises treating a culture broth, obtained by cultivating a grisein producing strain of the microorganism *Streptomyces griseus*, with activated charcoal, eluting the charcoal with an aqueous solution of α-picoline, concentrating the eluate to a small volume, diluting the concentrate with a lower aliphatic alcohol, filtering the mixture, adding ether and recovering the grisein containing precipitate thus formed.

FREDERICK A. KUEHL, Jr.
LOUIS CHAIET.

REFERENCES CITED

The following references are of record in the file of this patent:

Reynolds et al., Proc. Soc. Exp't'l. Biol. Med., vol. 64, pp. 50–54 (Jan. 1947).